United States Patent Office 3,385,661
Patented May 28, 1968

3,385,661
METHOD OF PREPARING SODIUM
TRIPOLYPHOSPHATE
Masashi Hayakawa, Tokyo, and Yoshito Yasutake, Ube-shi, Japan, assignors to Central Glass Co., Ltd., Ube-shi, Yamaguchi-ken, Japan
No Drawing. Filed Apr. 29, 1965, Ser. No. 452,002
5 Claims. (Cl. 23—106)

ABSTRACT OF THE DISCLOSURE

A method for producing Form II sodium tripolyphosphate by spraying an aqueous solution of sodium orthophosphate having an $Na_2O:P_2O_5$ mole ratio of 5:3 into an atomizing tower maintained at a temperature of 180°–280° C. by the injection of a high temperature gas to thereby form an intermediate product consisting principally of sodium pyrophosphate and thereafter calcining the intermediate product in a rotary kiln maintained at a temperature of 250–450° C. to convert said intermediate product into Form II sodium tripolyphosphate.

---

The present invention relates to an improved method of obtaining so-called Form II sodium tripolyphosphate in powder or granular form with excellent solubility from a sodium orthophosphate solution. Two crystal transitional forms of sodium tripolyphosphate ($Na_5P_3O_{10}$) are known and which are distinguished from each other as Form I and Form II. Of these two transitional forms, the one which is generally utilized for the production of detergents, anti-scaling agents and other chemicals for industrial use is the Form II sodium tripolyphosphate as it is superior in solubility to the other.

The generally known method of preparing sodium tripolyphosphate comprises preparing a sodium orthophosphate solution with an $Na_2O:P_2O_5$ mol ratio of 5:3; torrefying the solution by spraying or by other means to obtain torrefied sodium orthophosphate; and heating the torrefied material at a temperature of 300°–400° C. in a heating furnace to effect dehydro-polymerization.

However, sodium orthophosphate presents the following disadvantages during the heating-dehydration process: it is converted into a viscous state, whereupon a part of it fuses to the surfaces of the wall or other parts of the furnace, and further sinters thereto causing difficulty in operation, and thus the final product tends to contain granules of the formed sinters.

Another method that has been proposed contemplates obtaining sodium tripolyphosphate in one process by spraying the starting solution directly into a highly heated gas. According to this method, vaporization of water and the dehydration reaction which are carried out at a high temperature have to be completed within a short period of time. Accordingly, this method is not only undesirable from the viewpoint of heat-economy, but also gives rise to difficulty in the precise setting of the dehydration time, the steam pressure, etc. which are factors necessary for the production of Form II sodium tripolyphosphate. Moreover, the product obtained by this method is liable to contain Form I sodium triphosphate in no small proportion.

The present inventors have carefully considered the process of reactions carried out by the sodium orthophosphate torrefied from the starting solution when the former was subjected to dehydration by heating till it was converted into sodium tripolyphosphate. It has been found that during this process various intermediates are produced due to the uneven dehydration reactions, and that the reactions proceeded through complicated stages, making the entire operation a difficult one.

It has also been found that it was mostly during the initial stage of the reactions that the reacting material became viscous and that it was the latter stage of reactions that contributed to the production of Form I and Form II. It was further found that the method of obtaining sodium tripolyphosphate by means of spraying involved a high temperature and required that the operation be completed within a short period of time, thereby this method, in fact, tended to produce Form I sodium tripolyphosphate. The mechanism of the reactions by which sodium orthophosphate is converted into sodium tripolyphosphate by dehydration is, as hereinabove described, complicated. However, the mechanism may be divided roughly into two stages. In the initial stage of dehydration, orthophosphate is converted into pyrophosphate. In the latter stage, as dehydration proceeds, said pyrophosphate is transformed into sodium tripolyphosphate.

The principal reactions observed are as follows.

In the initial stage:

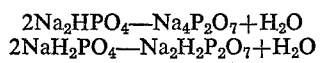
$2Na_2HPO_4 \rightarrow Na_4P_2O_7 + H_2O$
$2NaH_2PO_4 \rightarrow Na_2H_2P_2O_7 + H_2O$ In the latter stage:

$2Na_4P_2O_7 + Na_2H_2P_2O_7 \rightarrow 2Na_5P_3O_{10} + H_2O$

The method of the present invention is based on the foregoing findings. The characteristic features of the present method include: preparing a sodium orthophosphate solution with an $Na_2O:P_2O_5$ mol ratio of 5:3; spraying said solution into an atomizing tower in which same is torrefied and further subjecting the torrefied solution to dehydration reaction of the initial stage, the temperature inside said tower being maintained higher than the order of 180° C. (but below the order of 280° C. The temperature of the torrefied material does not rise above 250° C. because of the passage time being short) which is higher than the level necessary for torrefying the material, that is 110–140° C.; leaving the reacting material in the gas in said tower until the material becomes viscous; and continuing the heating-dehydration of the torrefied material by heating the thus obtained intermediate products at a temperature of 250–450° C. until said material is converted into Form II sodium tripolyphosphate.

Though the temperature in the atomizing tower may vary with its type scale, the spray condition, etc., it is necessary that the temperature at key portions in the tower be maintained not lower than 180° C. The terms "key portion" hereinabove referred to means such principal zones other than the topmost portion and those portions near the inlet and the outlet of gas, where the material to be torrefied makes contact with the gas.

Example I

A sodium orthophosphate solution containing 25.0% $P_2O_5$ and 18.2% $Na_2O$ was sprayed into an atomizing tower from an upper portion thereof. A hot blast of air of 500° C. was introduced into the tower from an upper portion thereof, thereby maintaining the temperature of the gas at the upper portion and the lower portion inside the tower at 280° C. and 210° C. respectively. As the starting solution was torrefied, dehydration reaction of the initial stage took place, converting about 60% of said $P_2O_5$ into pyrophosphate. The thus obtained intermediate products contained said pyrophosphate and the remainder of the components included orthophosphate and other phosphates in small amounts.

This intermediate product was heated to 350° C. in a rotary furnace in an atmosphere containing some water vapor, and thus a final product containing 97% Form II sodium tripolyphosphate was obtained.

No adhesion or sintering of the material to the wall surfaces in the atomizing tower or in the rotary furnace was noted.

Example II

A solution of sodium orthophosphate containing 26.0% $P_2O_5$ and 18.9% $Na_2O$ was prepared. The solution was sprayed into an atomizing tower in a manner similar to that of Example I, the temperature within said tower being maintained at 250° C. at the upper portion and 230° C. at the lower portion thereof. The remainders of the process was similar to that of Example I. A final product substantially equal to that described in Example I was obtained.

What is claimed is:

1. A method for producing Form II sodium tripolyphosphate, said method comprising spraying an aqueous solution of sodium orthophosphate having an $Na_2O:P_2O_5$ mole ratio of 5:3 into an atomizing zone maintained at a temperature of 180°–280° C. to form an intermediate product constituted of sodium pyrophosphate and thereafter subjecting the thusly formed intermediate product to calcining in a calcining zone maintained at a temperature of 250°–450° C. to produce Form II sodium tripolyphosphate.

2. A method according to claim 1 wherein the aqueous solution of sodium orthophosphate is sprayed into an atomizing tower and the temperature is maintained at 180°–280° C. by injecting a heated gas thereinto.

3. A method according to claim 2 wherein the heated gas is air at a temperature of about 500° C.

4. A method according to claim 1 wherein the intermediate product is subjected to calcining in a rotary kiln in the presence of water vapor.

5. A method according to claim 4 wherein the water vapor is formed when the sodium orthophosphate is converted to the sodium pyrophosphate which constitutes the intermediate product.

References Cited

UNITED STATES PATENTS

| | | | |
|---|---|---|---|
| 2,977,317 | 3/1961 | Rodis et al. | 252—135 |
| 3,054,656 | 9/1962 | Cassidy et al. | 23—106 |
| 3,233,967 | 2/1966 | Shen | 23—106 |

OSCAR R. VERTIZ, *Primary Examiner.*

MILTON WEISSMAN, *Examiner.*

L. A. MARSH, *Assistant Examiner.*